US009882632B1

(12) United States Patent
Fang

(10) Patent No.: US 9,882,632 B1
(45) Date of Patent: Jan. 30, 2018

(54) SATELLITE CONSTELLATION SWITCHING

(71) Applicant: SPACE SYSTEMS/LORAL, LLC, Palo Alto, CA (US)

(72) Inventor: Jun Fang, San Jose, CA (US)

(73) Assignee: SPACE SYSTEMS/LORAL, LLC, Palo Alto, CA (US)

( * ) Notice: Subject to any disclaimer, the term of this patent is extended or adjusted under 35 U.S.C. 154(b) by 0 days.

(21) Appl. No.: 15/388,269

(22) Filed: Dec. 22, 2016

(51) Int. Cl.
*H04B 7/185* (2006.01)
*H04B 7/155* (2006.01)

(52) U.S. Cl.
CPC ......... *H04B 7/18521* (2013.01); *H04B 7/155* (2013.01); *H04B 7/18504* (2013.01)

(58) Field of Classification Search
CPC . H04B 7/18521; H04B 7/155; H04B 7/18504
USPC ....................................................... 455/13.1
See application file for complete search history.

(56) References Cited

U.S. PATENT DOCUMENTS

| | | | | |
|---|---|---|---|---|
| 6,272,317 B1 * | 8/2001 | Houston | ............ | H04B 7/18578 342/354 |
| 6,404,769 B1 * | 6/2002 | Kapoor | ............... | H04B 7/18584 340/3.42 |
| 7,821,981 B2 | 10/2010 | Smith | | |
| 8,730,864 B2 | 5/2014 | Natarajan | | |
| 8,780,928 B2 * | 7/2014 | Natarajan | .......... | H04B 7/18584 370/400 |

OTHER PUBLICATIONS

Ekici, et al., "A Distributed Routing Algorithm for Datagram Traffic in LEO Satellite Networks," IEEE/ACM Transactions on Networking, vol. 9, No. 2, Apr. 2001.
Elsayed, "Overview of the Evolving IEEE 802.17 Resilient Packet Rings Standard," Jul. 2003.
Gounder, et al., "Routing in Leo-Based Satellite Networks," Published in Wireless Communications and Systems, 2000. Apr. 1999 Emerging Technologies Symposium.
Henderson, et al., "On Distributed, Geographic-Based Packet Routing for LEO Satellite Networks," Published in Global Telecommunications Conference, Dec. 2000. GLOBECOM '00. IEEE.
International Telecommunication Union, ITU-T Recommendation X.87/Y.1324, Multiple Services Ring Based on RPR, Oct. 2003.
Mancuso, et al., "Switched Ethernet Networking over LEO Satellite," Oct. 2005.
IEEE Computer Society, Part 17: Resilient packet ring (RPR) access method and physical layer specifications, Sep. 20, 2011.
Sliti, et al. "Optical Multicast Protocol for LEO Satellite Networks," SPACOMM2014: The Sixth International Conference on Advances in Satellite and Space Communications.

* cited by examiner

*Primary Examiner* — Sanh Phu
(74) *Attorney, Agent, or Firm* — Vierra Magen Marcus LLP

(57) ABSTRACT

A constellation of satellites form a communication system that includes communication between satellites and ground terminals as well as communication between satellites. The inter-satellite communication is implemented via wireless network comprising a first set of rings in a first orientation and a second set of rings in a second orientation. Each ring of the first set of rings and the second set of rings comprises two ringlets transmitting in opposite directions. Each satellite of the plurality of satellites is configured to communicate in a ring of the first set of rings and communicate in a ring of the second set of rings.

25 Claims, 10 Drawing Sheets

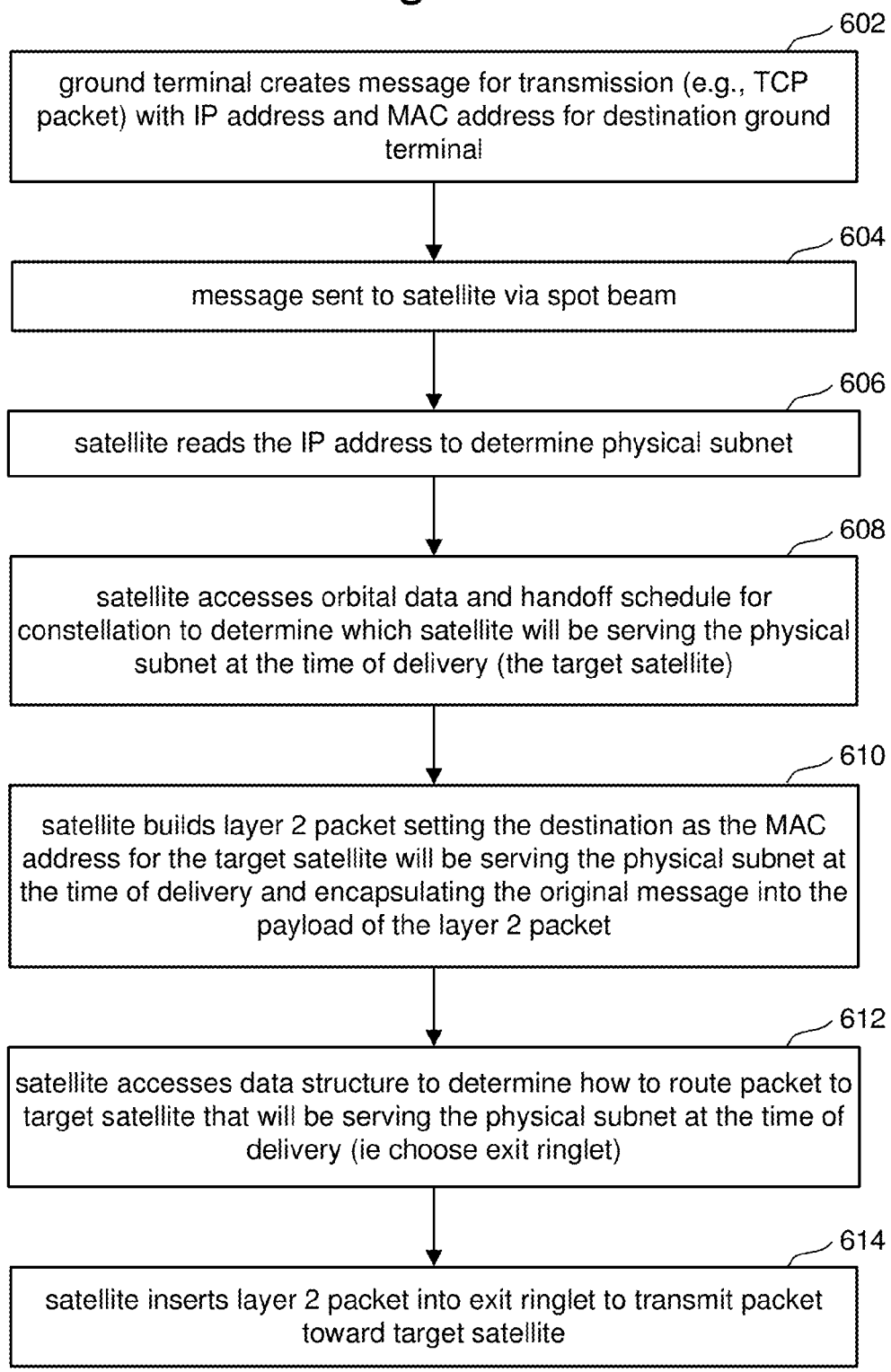

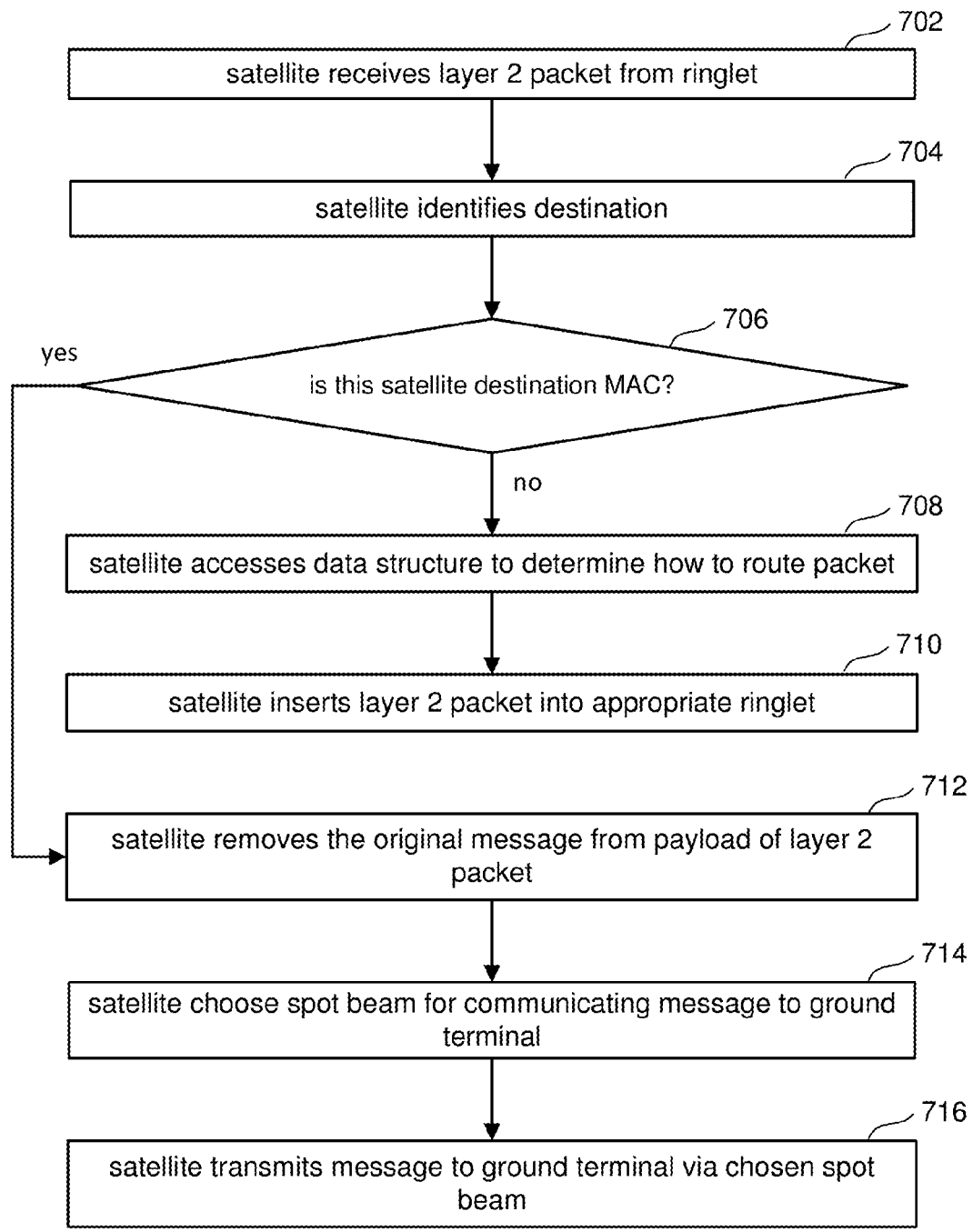

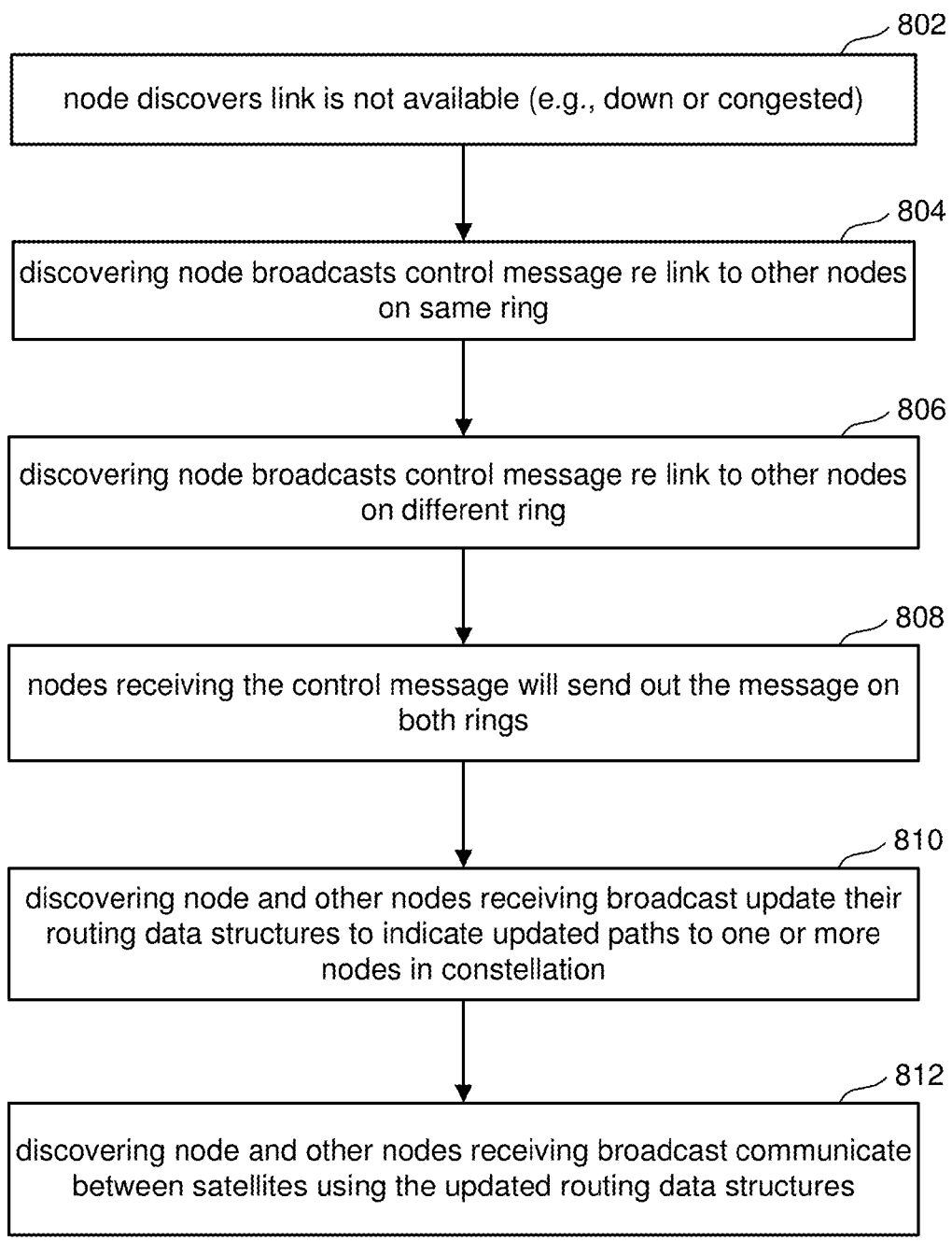

SATELLITE CONSTELLATION SWITCHING

BACKGROUND

Communications systems using a satellite constellation generally include a plurality of communications satellites that orbit a primary body (such as the Earth) on substantially fixed paths. The plurality of communications satellites (known as a satellite constellation) forms a communications network having a node at each satellite. Each satellite in the constellation generally has the ability to communicate with one or more ground stations on the Earth's surface (via uplinks and downlinks) as well as with other satellites in the constellation (via inter-satellite links). Using these satellite capabilities, the satellite communications system can provide communication between users in geographically diverse places on Earth. As with any communication system, performance and reliability are important to users of the system.

BRIEF DESCRIPTION OF THE DRAWINGS

FIG. 9 is a flow chart describing one embodiment of a process for inserting a message into a communication system.

FIG. 10 is a flow chart describing one embodiment of a process for operating on a message in the communication system.

FIG. 11 is a flow chart describing one embodiment of a process for automatically discovering that at least a portion of a wireless inter-satellite in-space network is not available and automatically adapting thereto.

DETAILED DESCRIPTION

A high-speed and reliable satellite communication system is proposed that implements a two-dimensional dual-ring topology for the inter-satellite links. Level two switching is used at the satellite nodes.

In one embodiment, a constellation of satellites form a satellite communication system that includes communication between satellites and ground terminals as well as communication between satellites. The inter-satellite communication is implemented via a wireless network comprising a first set of rings in a first orientation and a second set of rings in a second orientation. Each ring of the first set of rings and each ring of the second set of rings comprises two ringlets transmitting in opposite directions. Each satellite of the plurality of satellites is configured to communicate in a ring of the first set of rings and communicate in a ring of the second set of rings.

Figure 1:
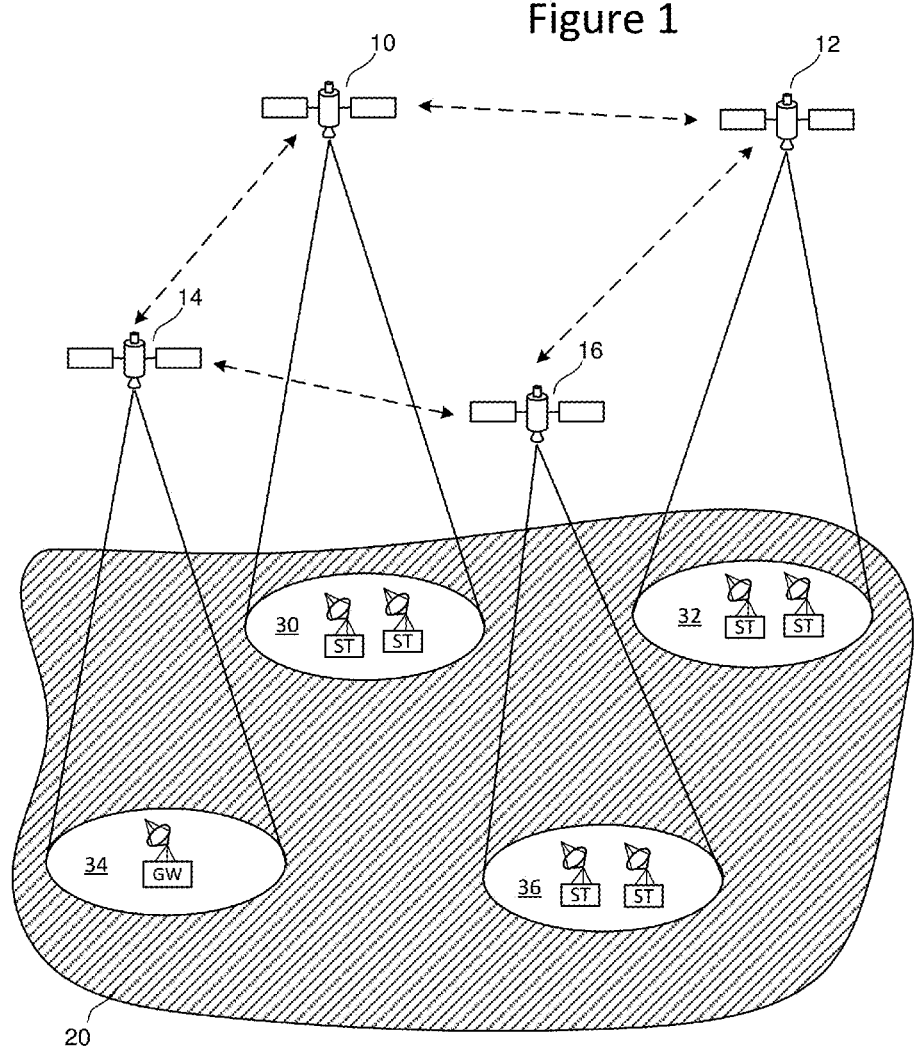
FIG. 1 depicts a portion of satellite communications system.

FIG. 1 depicts a portion of satellite communications system that includes communication between satellites and ground terminals as well as communication between satellites. The satellite communications system includes satellites 10, 12, 14 and 16. In some embodiments, the satellite communication system will include more or less than four satellites. The four satellites of FIG. 1 are only a subset of satellites in one example of a satellite communication system. Shaded region 20 represents a portion of the surface of the Earth that is being serviced by satellites 10, 12, 14 and 16 at the moment in time depicted in FIG. 1. Satellite 10 is servicing region 30 with one or more spot beams. Satellite 12 is serving region 32 with one or more spot beams. Satellite 14 is servicing region 34 with one or more spot beams. Satellite 16 is servicing region 36 with one or more spot beams. Each of the regions 30, 32, 34 and 36 include many subscriber terminals ST and one or more gateways GW. For example purposes only, FIG. 1 shows two subscriber terminals ST in region 30, two subscriber terminals ST in region 32, two subscriber terminals ST in region 36, and one gateway GW in region 34. However, it is anticipated that each of the regions depicted will have many subscriber terminals ST (e.g., thousands) and many gateways GW.

Each of the satellites 10, 12, 14 and 16 can communicate messages back and forth with subscriber terminals ST and one or more gateways GW in the region being serviced. For example, the subscriber terminals ST depicted in FIG. 1 that are in region 30 can communicate messages to and from satellite 10, the subscriber terminals ST depicted in region 32 can communicate messages to and from satellite 12, gateway GW in region 34 can communicate messages to and from satellite 14, and the subscriber terminals ST depicted in region 36 can communicate messages to and from satellite 16.

FIG. 1 also shows dashed arrows to indicate communication between the satellites. Each of the dashed arrows represent an inter-satellite link. For example, satellite 10 can directly communicate with satellites 12 and 14. Satellite 16 can directly communicate with satellites 12 and 14. For satellite 16 to communicate with satellite 10, messages have to be passed via satellite 12 or satellite 14. For example, a subscriber terminal ST in region 36 wishing to communicate with a subscriber terminal ST in region 30 will send a message to satellite 16, which will forward that message to satellite 12, which will forward that message to satellite 10, which will forward that message to the subscriber terminal ST in region 30. A subscriber terminal ST in region 30 wishing to communicate with a gateway GW in region 34 will send a message to satellite 10, which will forward that message to satellite 14, which will forward that message to the gateway GW in region 34.

Each of the inter-satellite links depicted by dashed arrows in FIG. 1 form a wireless in-space network. There are many different suitable configurations for placement and movement of the satellites that comprise the communication system, and there are many different suitable architectures of the in-space network. In one embodiment, it is proposed that the constellation of satellites orbit the earth in a set of planes, with each plane representing an orbit around the Earth.

Figure 2:
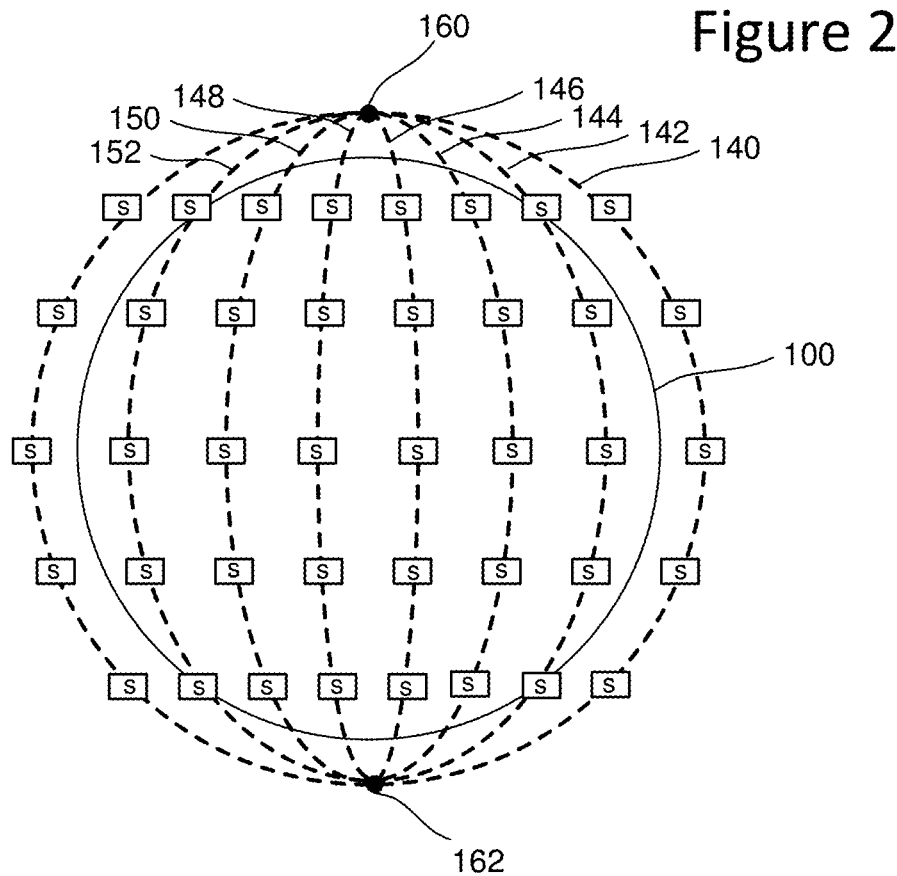
FIG. 2 depicts a constellation of satellites in orbit around the Earth.

FIG. 2 depicts a constellation of satellites S in orbit around the Earth 100. In one embodiment, each of the satellites of the constellation depicted in FIG. 2 can be Low Earth Orbit (LEO) satellites. In other embodiments, the satellites can be Medium Earth Orbit (MEO) satellites. Other types of satellites (and other distances from the earth) can also be used. Surrounding the Earth 100 are a set of planes 140, 142, 144, 146, 148, 150 and 152, each representing an orbit around the Earth. FIG. 2 also shows a plurality of satellites S representing the constellation of satellites. Each satellite of the constellation is orbiting the Earth 100 in one of the planes 140-152. In one embodiment, the constellation of satellites S includes satellites 10, 12, 14 and 16 of FIG. 1. The satellite network is composed of N polar orbits (planes) 140-152, each with M satellites S at one or more pre-defined distances from the Earth. The planes 140-152 are separated from each other with the same angular distance 360°/(2×N). The planes 140-152 cross each other only over the North Pole 160 and the South Pole 162. The satellites S in a plane are separated from each other with an angular distance of 360°/M. Since the planes are circular, in one embodiment, the radii of the satellites in the same plane are the same at all times and so are the distances from each other. This satellite constellation is classified as a Walker type with a parameter M/N/0. In Walker notation, it is M/N/p, with M the number of satellite per plane, N the number of planes, and p the number of distinct phases of planes to control spacing offsets in planes.

The geographical location of a satellite S is given by $(lon_S, lat_S)$ indicating the longitude and latitude of the location of satellite S. In one embodiment, it is assumed that the entire Earth (or portion of the Earth) is covered by logical locations of the satellites S. These logical locations are serviced by the nearest satellite S. For example, FIG. 1 shows regions 30, 32, 34 and 36 that are examples of logical locations. The identity of a satellite is not permanently coupled with a current logical location, as the satellites are orbiting the Earth and a current logical location for a satellite will be taken over by the successor satellite in the same plane. This is referred to as a handover.

All satellites within the same plane are moving in the same circular direction. As a consequence, any satellite that is observed from the Earth moving from South to North will be observed to start moving from North to South when it crosses the North pole. Hence, the 0th and the Nth planes rotate in opposite directions. The borders of counter-rotating satellites are called seams.

Each satellite has four neighboring satellites: two in the same plane and two in neighboring planes (one in the left neighbor plane and one in the right neighbor plane). The inter-satellite links in the same plane are called intra-plane inter-satellite links. The inter-satellite links between satellites in different planes are called inter-plane inter-satellite links. In one embodiment, intra-plane inter-satellite links and inter-plane inter satellite links are by bi-directional.

Figure 3:
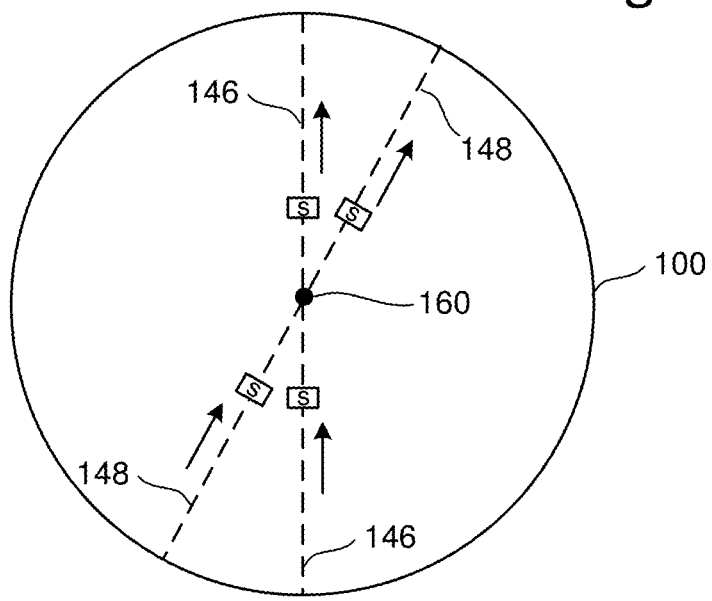
FIG. 3 depicts a plurality of satellites in orbit around the Earth.

FIG. 3 provides a view of Earth 100 from the North Pole 160 showing satellites S moving on planes 146 and 148. In one embodiment, the inter-plane inter-satellite links are operated only outside the polar region. When satellites move toward the polar regions, the inter-plane inter-satellite links become shorter. When two satellites in adjacent planes cross the poles they switch their positions. In order to allow this switching, in one embodiment inter-plane inter-satellite links are shut down in polar regions and re-established outside the polar regions. At each orbit swap, one on North pole and another on South pole, the inter-plane RPR rings flip, while intra-plane RPRs remain unchanged. However, only the directions change at each swap and only physical layer connections are East-West swapped as described here. At MAC layer, these swaps are transparent up to inner- and outer-ringlets permutation.

The satellites S of the constellation depicted in FIGS. 1-3 are configured to wirelessly communicate with other satellites (e.g., neighbors) via RF communication, optical communication, or other wireless technologies. There are many architectures and topologies that can be used for the in-space network formed by the inter-satellite links. In one embodiment, the in-space network for communicating between the satellites S of the constellation depicted in FIG. 2 (and FIG. 1) is based on Resilient Packet Rings (RPR). More details about standard RPR technology is provided in the IEEE standard 802.17. A traditional RPR uses a bi-directional ring consisting of two symmetric counter-rotating fiber rings. One of the rings is called the outer ring while the other ring is called the inner ring. Each of the outer ring and inner ring is referred to as a ringlet. Thus, the bi-directional ring includes two ringlets. The two ringlets can be simultaneously used for both traffic and control packets. A participant node operates by sending traffic packets in one direction (downstream) and sending the associated control packets in the opposite direction (upstream) on the other ringlet. RPR is based on using statistical multiplexing. No time slot or dedicated bandwidth is allocated for (regular) traffic. By correctly dimensioning the network and forecasting the traffic demands, statistical multiplexing can offer orders-of-magnitude gains over other architectures.

In some embodiments, RPR defines three service classes for user traffic: class A or premium priority, class B or medium priority, and class C or low priority traffic. Class A is allocated with a committed information rate (CIR) and provides the lowest end-to-end delay and jitter. Class B is allocated a certain CIR and provides bounded delay and jitter for the amount of traffic within the profile on the CIR. Excess traffic above the CIR is referred to as excess information rate (EIR) class B traffic. Class C is mainly a "best effort" opportunistic service class that uses whatever remains of the network capacity. Class B EIR traffic is treated similarly to Class C traffic. This traffic is subject to the distributed fairness operation of the RPR protocol and is marked as fairness-eligible (FE) traffic.

An RPR node processes its own local traffic and transit traffic. In the case of a satellite implementing a node, local traffic is traffic between a satellite and ground terminals and transit traffic is traffic between a satellite and other satellites on the in-space network. Transit traffic is traffic not originating or terminating at the local node, in essence its traffic generated at other nodes and passing through the RPR node on its way to the requested destination.

In some embodiments, an RPR contains separate queues for the local and transit traffic. The queues handling the local traffic are named the transit queues and one embodiment includes three queues, one for each of the three classes. For transit traffic, there are two possible implementations. The first version uses two transit queues: a primary transit queue (PTQ) for class A transit traffic and a secondary transit queue (STQ) for class B and C traffic. The second version implements one transit queue for all types of transit traffic (which is also termed PTQ). In addition to the transmit and transit traffic queuing, all traffic is shaped/rate-controlled in order to maintain service class guarantees. However no traffic shaping is applied to transit traffic at the PTQ. The RPR MAC Client can transmit packets from five possible queues in a duel transit queue implementation and from four queues in the single-transit queue implementation. The RPR MAC decides on which queue frames to send next based on priority scheme. In the dual transit queue implementation, class A transit traffic in the PTQ are always sent first. Class A local traffic may be sent as long as the STQ is not almost full (as determined by a certain threshold). Local class B traffic within the CIR is sent next as long as the STQ is not almost full. Local EIR class B in the class B transmit queue and local class C traffic is sent next as long as they do not violate the fair share of the bandwidth and the STQ has not exceeded a low priority threshold. If nothing else can be sent, then traffic in the STQ can be sent. In the single transit queue implementation, transit traffic is always sent first. Local traffic will then be sent in the order class A, class B, and EIR class B and class C. EIR class B and class C traffic will be limited to the fair rate governed by the distributed RPR fairness protocol.

In RPR, the media access control ("MAC") protocol operates in a destination stripping mode. Other technologies are based on source stripping, where the packet circulates the whole ring until it returns to the source where the packet is removed from the ring. In contrast, RPR uses destination stripping, where the destination removes the packet from the ring. The full ring bandwidth and other segments of the ring are then available for use by other source-destination pairs. This feature is unique to RPR and known as spatial reuse.

In the case of an in-space network implemented by a constellation of satellites, the physical layer of the in-space network will include the wireless transmission links (e.g. RF or optical). Above the physical layer will be a layer two switch. In one embodiment, each satellite S of the constellation (see FIGS. 1-3) will include a layer two switch performing a MAC protocol that implements a derivation of RPR. Rather than implement a standard RPR topology, the constellation of FIG. 2 (or FIG. 1) will implement an in-space network that includes two sets of rings. A first set of rings are in a first orientation and a second set of rings are in a second orientation.

Figure 4:
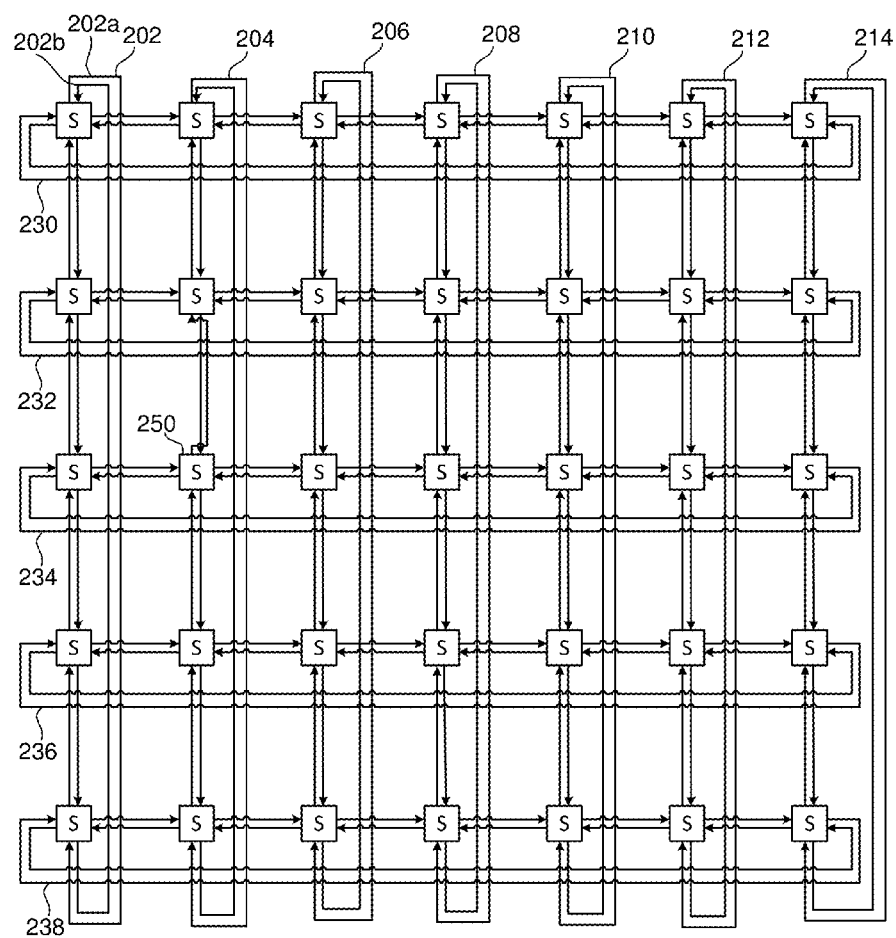
FIG. 4 depicts an inter-satellite in-space network.

FIG. 4 depicts an example of one embodiment of an in-space network that includes the two sets of rings in different orientations (ie first and second orientations). FIG. 4 shows the plurality of satellites S that form a constellation. These can be the same satellites as FIGS. 1-3. Each column of satellites S are in the same plane. Thus, the satellites of the constellation are configured to travel in a set of planes. Although FIG. 4 shows seven planes having five satellites in each plane, other embodiments can include more or less than seven planes and more or less than five satellites per plane.

The first set of rings depicted in FIG. 4 are intra-plane rings. The second set of rings are inter-plane rings. For example, in the first set of rings (the intra-plane rings) comprise rings 202, 204, 206, 208, 210, 212 and 214. As discussed, each of the intra-plane rings includes two ringlets. For example, ring 202 includes ringlet 202A and ringlet 202B. The other ringlets of the other rings are not separately marked to keep the drawing easier to read. The second set of rings, the inter-plane rings, include rings 230, 232, 234, 236 and 238. As discussed above, each of the inter-plane rings includes two bi-directional ringlets. As depicted in FIG. 4, the first set of rings, the intra-plane rings, are oriented North-South while the second set of rings, the inter-plane rings, are oriented East-West. Therefore, in one embodiment, the first set of rings are orthogonal to the second set of rings.

Each satellite S operates as a layer two switch (see OSI Network Model) and is in communication with one intra-plane ring of the first set of rings and one inter-plane ring of the second set of rings. For example, satellite 250 is connected to and performs as a layer two switch for rings 204 and 234. Each layer two switch of each satellite implements a MAC layer protocol and can bridge the two rings connected to that satellite.

Each of the satellites S is configured to communicate with four neighbors, with two of the neighbors being in the same plane and two of the neighbors being in neighboring planes. As each satellite of the constellation orbits earth, it is handed off between ground terminals in different locations, and the plurality of satellites are configured to determine a target satellite of the constellation of satellites orbiting earth that will be in an orbital position to service the destination of a message at a future time of delivery of the message to the destination and transmit that message towards the identified target according to the layer two protocol described herein.

Each node (satellite S) performs layer two switching with handover (between ground terminals). In the nodes of the proposed in-space network, when a satellite moves to service a new region or logical location, the ground stations within the beam handover to the next satellite in the physical layer first and then frames received from the ground by the satellite are switched to their destined nodes with one hop more or less, per the direction of the forwarding, in the plane inner or outer ringlets. This implies that the previous established sessions are still maintained with a minor update to the hopping steps. A frame gets into a node and it is forwarded by moving in either the inner ringlet or outer ringlet of either ring (North-South or East-West) with a calculated number of hops. For an example, if a frame with a specific destination address gets into the node J and the destine node is the node K, the number of hops for the frame to traverse is $n=|j-k|$ (inner-ringlet), or $n=L-|j-k|$ (outer-ringlet), where L is the total number of nodes in the RPR. In the RPR standard, 256 nodes are supported. Thus, in one embodiment, the satellite constellation has no more than 256 satellites. The proposed augmented MAC switch can read the destination address of the upcoming frames and determine the number of hops and forward them (with all of the necessary operations performed). The proposed new MAC switch is still transparent to the physical layer.

In one embodiment, the following protocols are implemented for each node of the satellite's base network. The Spatial Reuse Protocol will be implemented but now in two dimensions. Fairness algorithms known in the art can be used and extended in the proposed two dimensional architecture. Topology discovery and protection protocols still work in the same way on each of the rings, but the node status frames are broadcast to all nodes for better fairness control and protection. VLAN per IEEE 802.1Q compatibility is based on the fact that VLAN tags can be associated with a satellite in a constellation so that the MAC Client and each node satellite can use this tag for directing the frames to either North-South rings or East-West rings.

The spanning tree family (xSTP: FSTP and MSTP), and SPB (shortest path bridging) can be applied to the proposed two-dimensional architecture. The RPR has a simple and efficient traffic flow set up mechanism and does not need xSTP/SPB in normal operation, it can still use them as RPR is compatible with xSTP (802.1D/Q). SPB would be preferable in a satellite constellation in-space network and SPB will be considered because it provides a much larger topologies without xSTP limitations.

As the two-dimensional architecture can be seen as a special mesh switch fabric, SPB can be applied to it, so the proposed architecture is compatible with 802.1AQ in view of VLAN service provisioning. The IS-IS protocol with 802.1AQ extension provides the basis for multi cache/broadcast services. In a similar way, 802.1AH is also applicable. In one embodiment, any path within in-space network (either vertical or horizontal) operates as RPR flow. The proposed network solution has a natural service provisioning with a direct data link layer protocol MSR (Multiple Services Ring) based on RPR (ITU-T X.87/Y1324). MSR is an efficient packet MSTP (multiple service transport platform) solution. It is Ethernet oriented and named also "CESP" (carrier Ethernet multi-service platform). MSR supplies all services on a tributary basis: voice over TCE (TDM circuit based emulation), video over DVB, and data over carrier Ethernet, where the term tributary is either a traffic flow or an interface or part of a set of them, defined by user service requirements. MSR provides QoS per tributary to meet service level agreement requirements. MSR is a data link protocol, transparent to upper layers and is well adapted for the proposed technology described herein. In one embodiment, it is the MAC Client for RPR and it is one of the appropriate solutions to support multimedia services with QoS.

Figure 5:
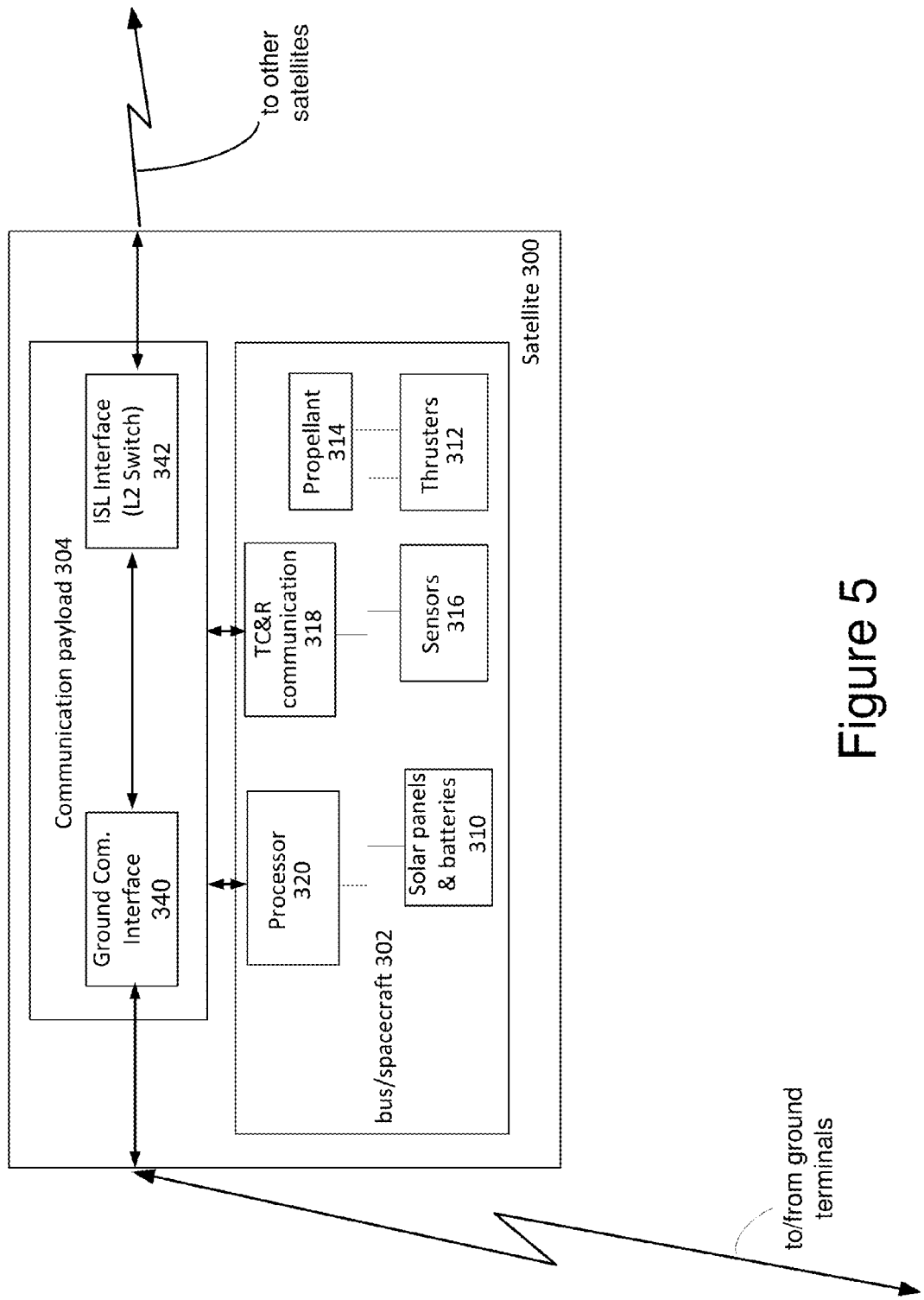
FIG. 5 is a block diagram of one embodiment of a satellite (or other spacecraft).

FIG. 5 is a block diagram of one embodiment of a satellite 300, which can represent any of the satellites S depicted in FIGS. 1-3. In one embodiment, satellite 300 includes a spacecraft (also known as a bus) 302 and a communication payload 304 carried by bus 302. Some embodiments of satellite 300 may include more than one payload. The payload provides the functionality of the communication system described herein.

In general, bus 302 is the spacecraft that houses the payload. For example, the bus includes solar panels and one or more batteries 310, thrusters 312, propellant 314, sensors 316, T, C & R communication and processing equipment 318, and processor 320. Other equipment can also be included. Solar panels and batteries 310 are used to provide power to satellite 300. Thrusters 312 are used for changing the position or orientation of satellite 300 while in space. Propellant 314 is for the thrusters. Sensors 316 are used to determine the position and orientation of satellite 300. T, C & R communication and processing equipment 318 includes communication and processing equipment for telemetry, commands from the ground to the satellite and ranging to operate the satellite. Processor 320 is used to control and operate satellite 300. An operator on the ground can control satellite 300 by sending commands via T, C & R communication and processing equipment 318 to be executed by system processor 320. Some embodiments include a Network Control Center that wirelessly communicates with T, C & R communication and processing equipment 318 to send commands and control satellite 300. In one embodiment, processor 320 and T, C & R communication and processing equipment 122f are in communication with the communication payload 304.

In one embodiment, the communication payload 304 includes an antenna system (not depicted) that provides a set of one or more beams (e.g., spot beams) comprising a beam pattern to receive wireless signals from ground stations and to send wireless signals to ground stations. In one example, an entire service region is covered using one beam. In another example, however, the antenna system provides a beam pattern that includes multiple spot beams, with each spot beam covering a portion of the service region. The portion of the service region covered by a spot beam is referred to as a cell. The individual spot beams divide an overall service region into a number of cells. For example, U.S. Pat. No. 7,787,819 describes a pattern of 135 spot beams covering the continental United States (CONUS), Hawaii, Alaska, and Puerto Rico. It is noted that a service region may be defined in any manner to cover any desired geographic location. In one embodiment, the antenna system includes a phased array antenna, a direct radiating antenna, or a multi-feed fed reflector.

Communication payload 304 also includes Ground Communication Interface 340 in communication with Inter-satellite Communication Interface 342. Ground Communication Interface 340, which is connected to the antenna system (not depicted), is configured to communicate with one or more ground terminals (e.g., send and receive messages to/from gateways and/or subscriber terminals). Inter-satellite Communication Interface 342, which is connected to the antenna system (not depicted), is configured to communicate with other satellites via the in-space network, such as the in-space network of FIG. 4 that includes two sets of rings in orthogonal orientations.

In one embodiment, the Inter-Satellite Communication Interface 342 is configured to access a message from a ground terminal for communication to a destination, encapsulate the message into a layer two packet, identify a target spacecraft of the constellation of spacecraft orbiting the Earth that will be in orbital position to service the destination at a future time of delivery of the message to the destination, choose a ringlet to transmit the encapsulated message in the layer 2 packet based on the identified target spacecraft, and send the encapsulated message in the layer 2 packet toward the identified target satellite via the chosen ringlet. In one embodiment, the Inter-Satellite Communication Interface 342 is also configured to discover that at least a portion of a ringlet is not available, send out one or more control packets on one or both of the connected network rings identifying the portion of the ringlet that is not available and updating a routing data structure based on the portion of the ringlet is not available.

Figure 6:
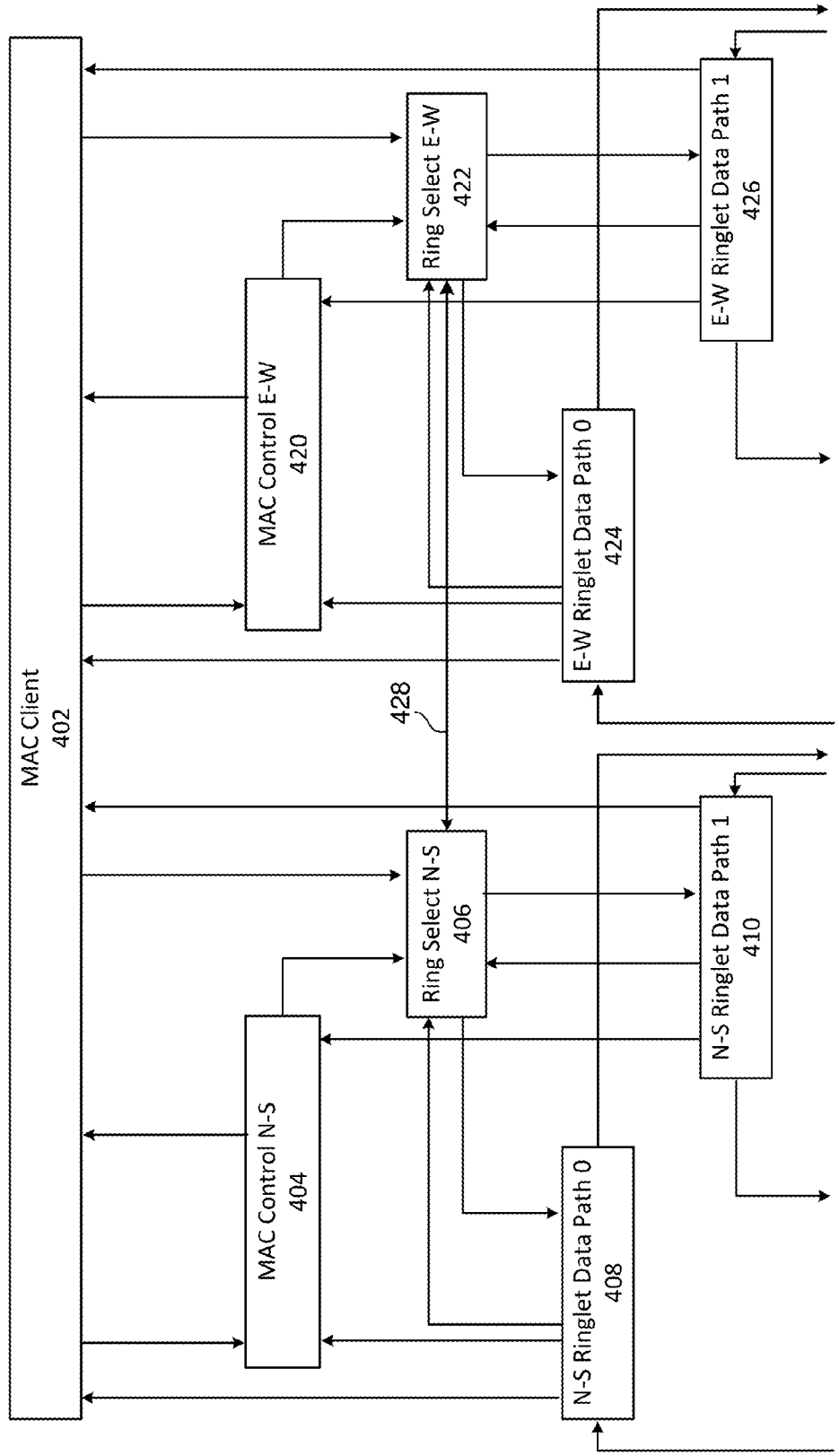
FIG. 6 is a block diagram of one embodiment of the components of an inter-satellite interface on a satellite.

FIG. 6 is a block diagram depicting one embodiment of the components of inter-satellite interface 342 (see FIG. 4), which is a level two switch. Each satellite includes a MAC Client 402. The MAC Client is in communication with MAC Control North-South 404 and MAC Control East-West 420. MAC Control North-South 404 is in communication with Ring Select North-South 406. North-South Ringlet Data Path 0 (408) is in communication with Ring Select North-South 406, MAC Control North-South 404 and MAC Client 402. North-South Ringlet Data Path 1 (410) is in communication with MAC Control North-South 404, Ring Select North-South 406 and MAC Client 402. Ring select East-West 422 is in communication with MAC Control East-West 420 and MAC client 402. East-West Ringlet Data Path 0 (424) is in communication with Ring Select East-West 422, MAC Control East-West 420 and MAC Client 402. East-West Ringlet Data Path 1 (426) is in communication with Ring Select East-West 422, MAC Control East-West 420 and MAC Client 402. Ring Select North-South 406 is also in communication with MAC Client 402. Each of the components (402-426) depicted in FIG. 6 can be implemented in software. In other embodiments, each of the components can be implemented as electrical circuits. In other embodiments, the components of FIG. 6 can be implemented as a combination of software and hardware (e.g., electrical circuits).

MAC Control North-South 404 is the MAC controller for the appropriate North-South ring (i.e. one of rings 202-214). MAC Control East-West 420 is the MAC controller for the East-West ring attached to the satellite (i.e. one of rings 230-238). MAC Client 402 communicates with Ground Communication Interface 340 to receive and transmit data (local data) for communication between a ground terminal and the satellite, and provides an interface for that local data to enter/exit the in-space network. MAC Client 402 decides which ring (North-South ring or East-West ring) that an incoming message is to be transmitted on. Ring select North-South 406 is used to select which ringlet of the North-South ring to transmit on. Ring select East-West is used for selecting which of the ringlets of the East-West ring to transmit on. In one embodiment Ring Select North-South 406 is in communication with Ring Select East-West 422. North-South Ringlet Data Path 0 (408) and North-South Ringlet Data Path 1 (410) are the data paths for the North- South ring (any one of 202-214). North-South Ringlet Data Path 0 is for one ringlet and North-South Ringlet Data Path 1 is for the other ringlet. MAC Control North-South 404 decides whether to forward data received North-South Ringlet Data Path 0 (408) or North-South Ringlet Data Path 1 (410) to another node on the in-space network or to send it to MAC Client 402 for transmission to the ground. The two data paths (North-South Ringlet Data Path 0 and North-South Ringlet Data Path 1) provide for transmission along the respective ringlets and include buffers (including the buffers discussed above). East-West Ringlet Data Path 0 (424) provides the data path and buffers for one of the East-West ringlets (for any one of rings 230-238) while East-West Ringlet Data Path 1 (426) provides the data path and buffers for the other of the East-West ringlets (for any one of rings 230-238).

In one embodiment, data being moved from one ringlet to another ringlet would pass between Ring Select North-South 406 and Ring Select East-West 422 (via path 428) or via MAC Client 402. Path 428 is the data pipe between the two orthogonal RPRs, when a data frame coming from either North or South, is going to either East or West, and vice versa. In one embodiment, this is implemented by either a register level data transfer, or a memory access process. The switching control is implemented by choosing a VLAN tagging plan in which 16-bit tags are segmented into two 8-bit sub-tags, each representing the number of hops in one orientation and in another orthogonal orientation. It can be shown that the total number of hops from any node to any other node is fixed, say, a certain number H. There are as many paths as the number of the ways H is decomposed into two positive numbers. The determination of the VLAN tags can be done with the awareness of the in-space network traffic loading status. The proposed VLAN encapsulation/de-encapsulation algorithm is performed in MAC Client 402. It is based on IEEE 802.1Q but with a specific application to the proposed two-dimensional network topology by dividing the VLAN tags into two sub-tags, matching perfectly IEEE 802.17 RPR node dimensionality. In practice, IEEE 802.1Q tagging is largely sufficient, but extensions to fit larger dimensionality can be easily accommodated, including, e.g., using two-fold VLAN tagging, one for each orientation.

Another embodiment consists of connecting the two native RPR MAC controllers via the on-board layer two switch using specifically dedicated ports. The RPR frame will quit an RPR and enter another, while VLAN encapsulation/de-encapsulation are still performed in MAC Client in the same way.

The VLAN setup in the proposed network topology can be based on the above-described "hopping number counting" method, although all the IEEE 802.1Q compatible methodologies can be applied.

In one embodiment, MAC Control North-South 404, Ring Select North-South 406, North-South Ringlet Data Path 0 (408) and North-South Ringlet Data Path 1 (410) provide a first interface for an intra-plane ring in communication with MAC Client 402, and MAC Control East-West 420, Ring Select East-West 422, East-West Ringlet Data Path 0 (424) and East-West Ringlet Data Path 1 (426) provide a second interface for an inter-plane ring in communication with the MAC Client 402.

Figure 7:
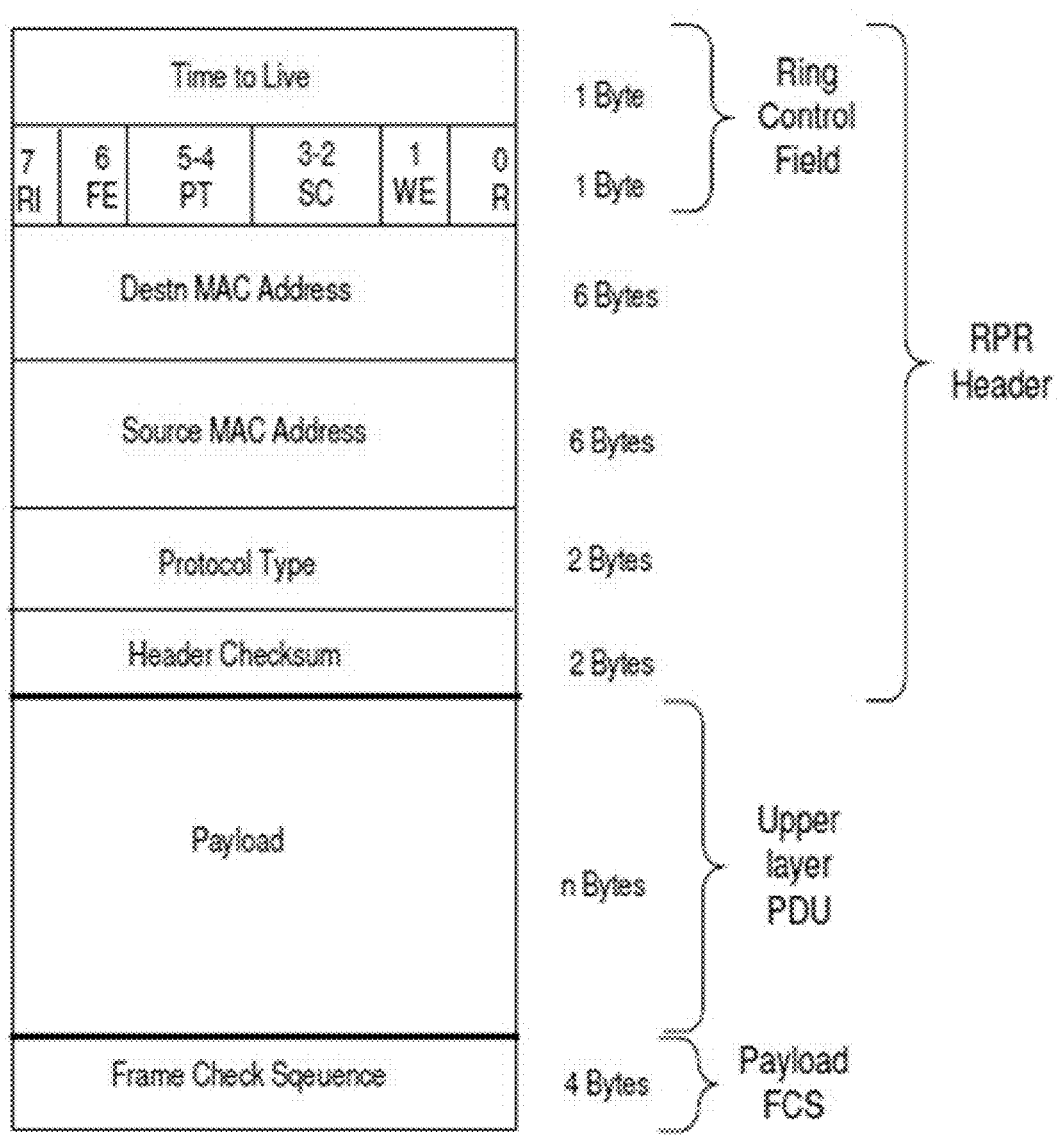
FIG. 7 depicts the format of a data packet.
Figure 8:
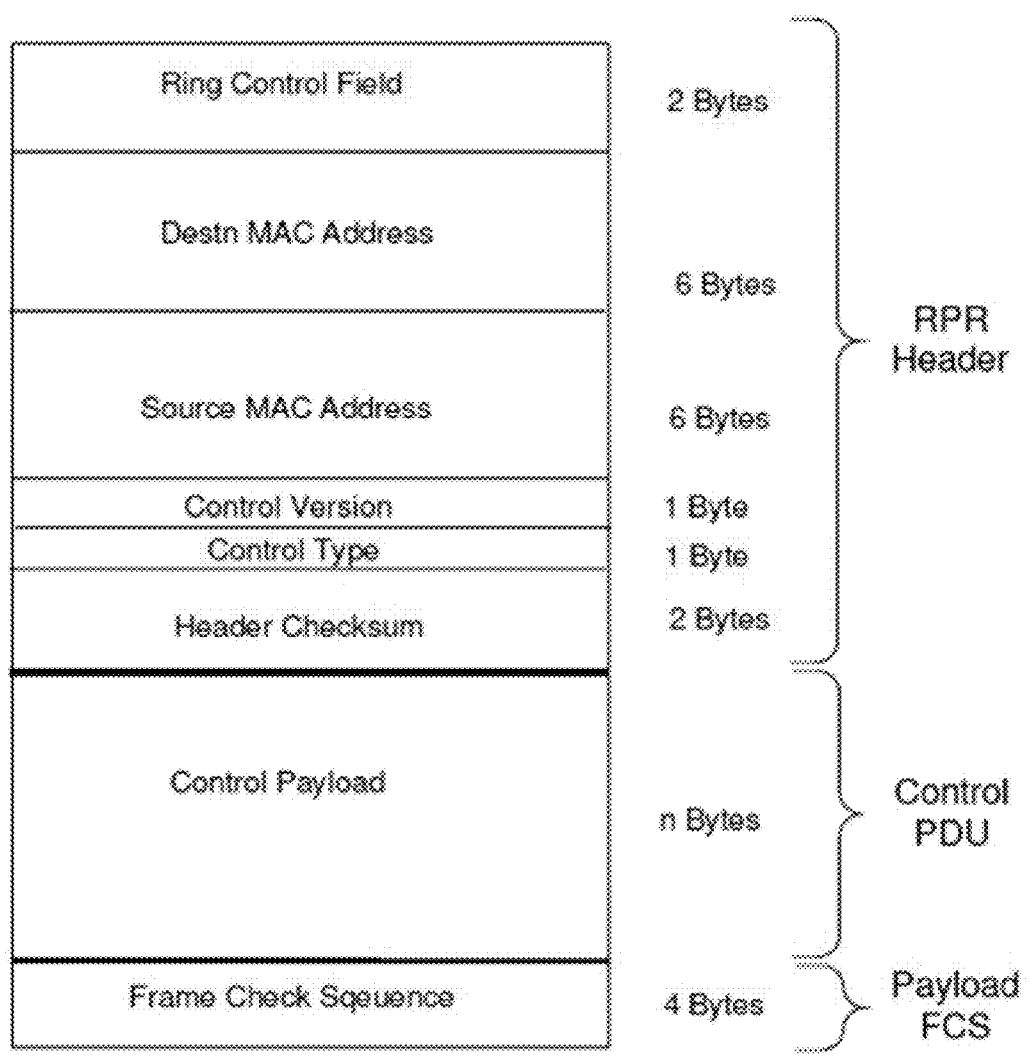
FIG. 8 depicts the format of a control packet.

FIG. 7 depicts one example format for a traffic (local or transit) packet to be transmitted within the in-space network. FIG. 8 depicts one example of a format of a control packet to be transmitted within the in-space network. Time To Live (TTL) is an 8 bit hop count that must be decremented each time a node processes an incoming packet. If the value becomes zero, the packet is stripped off the ring. This allows for a maximum ring size of 256 nodes. However due to ring wrapping in the case of failures, in one embodiment the actual number is 128 or 64 nodes. RI is a 1 bit field indicating on which ringlet was the frame originally transmitted. In one embodiment, RI is an 8 bit, 16 bit or other sized field to indicate which ringlet of the many rings the data is being transferred on. FE is a 1 bit field indicating whether the packet is eligible for a fairness protocol operation or not. PT is a 2 bit field that identifies the packet type as follows: 0 is reserved for future use, 1 is for control packets, 2 is for fairness (usage) packets and 3 is for traffic packets. SC is a 2 bit field which indicates the service class of the packet (value 0 through 3 indicate traffic classes C, B, A1, A0 respectively). DE is a 1 bit field indicating whether the packet is wrap eligible or not (i.e. whether at a wrap condition, the network can wrap the packet for protection or not). R is a 1 bit field that is reserved for future use. The destination MAC address and the source MAC address are 48 bit fields indicating the node to which the frame is intended and which originated the frame respectively. The address is the same as that defined for IEEE 802 protocol family. The following two bytes are different in the case of traffic or control packets. For traffic packets, the two bytes denote the protocol type. This field is used as follows: if its value is greater than 1536 then it identifies the MAC Client protocol, if less than 1536 then it identifies the length of the payload. For control packets, the first byte indicates the control version and the following byte identifies the type of control packet (e.g., topology discovery, protection, OAM). The Header Check Sum is a 16 bit error correction code computed over the RPR header, destination and source address, and the 2 bytes comprising the protocol type for traffic packets or the control version plus control type for control packets. Following the header, the packet contains a payload which is either user traffic or control information. For user traffic, in one embodiment, the payload encapsulates a message that was originated from a ground terminal and destined for another ground terminal. A frame check sequence comprised of a 32 bit cyclic redundancy check field is added at the end of the RPR frame. This cyclic redundancy check is generated similarly to other IEEE 802 standard and is generated on what follows the Header Check Sum (i.e. the payload).

Achieving fair bandwidth and resource sharing in a high speed ring architecture covering large distances in space can be one property of some embodiments of the proposed technology. In one example implementation, it is desirable that all nodes will have fair access to the available rings independent of their location or their aggregated generated traffic. To achieve this, the system could implement a Fairness Algorithm. There are many Fairness Algorithms known in the art that are suitable for various implementations of the in-space network described herein.

FIG. 9 is a flowchart describing on embodiment of a process for inserting a message into the in-space network. In step 602, a ground terminal (e.g. a Subscriber Terminal ST or a gateway GW) creates a message for transmission (e.g., TCP or UDP packet) with an IP address and a MAC address for the destination ground gateway/terminal. In step 604, that message is sent from the ground gateway/terminal to the appropriate satellite via one of the satellite's spot beams. In step 606, the receiving satellite reads the IP address (IP prefix) to determine the physical subnet. That physical subnet is on the earth's surface (or other location). By knowing the physical subnet, the satellite knows a rough idea of where the destination is on Earth. That is, the satellite will know which region/logical location (e.g. regions 30, 32, 34 and 36 of FIG. 1) that the destination resides in. In step 608, the satellite accesses orbital data for the entire constellation of satellites and the hand off schedule for the constellation of satellites to determine which satellite will be serving the physical subnet at the time of delivery. This will be known as the target satellite. In step 610, the satellite builds a layer 2 packet (see FIGS. 7 and 8) setting the destination as the MAC address for the target satellite that will be serving the physical subnet at the time of delivery. The satellite encapsulates the original message received from the ground gateway/terminal into the payload of the layer 2 packet. In step 612, the satellite accesses a data structure on the satellite to determine how to route to the target satellite that will be serving the physical subnet at the time of delivery (i.e. choose the exit ringlet). In one embodiment, the satellite has a table that indicates which exit ringlet to use to get to each of the nodes in the in-space network (e.g., i.e. the network of FIG. 4). In step 614, the satellite inserts the layer 2 packet built in step 610 into the exit ringlet to transfer the packet towards the target satellite. At the end of the process of FIG. 9, the message (inside a layer 2 packet), is now on the in-space network making its way towards the destination.

In one embodiment, there are two levels of encapsulation/de-encapsulation process for in-space network switching. One is at RPR level, another at VLAN level. The RPR framing is used to work with RPR protocols, and VLAN header is added and used for data frame forwarding in-space network.

FIG. 10 is a flow chart describing one embodiment of a process of operating on a message on the in-space network. That is, when a layer 2 packet arrives at a node (one of the satellites S) via one of the ringlets, then the process of FIG. 10 is performed. In step 702, the satellite receives a layer 2 packet from the ringlet. In step 704, the satellite identifies the destination. If the current satellite operating on the layer 2 packet is not the destination MAC address (step 706), then in step 708 the satellite accessed its data structure to determine how best to route the packet. In step 710, the satellite inserts the layer 2 packet into the appropriate exit ringlet to transmit the layer 2 packet toward its destination. If, however, the satellite currently operating on the layer 2 packet is the destination MAC address, then in step 712 the satellite removes the original message from the payload of the layer 2 packet. In step 714, the satellite chooses the appropriate spot beam from its plurality of spot beams for communicating the message to the appropriate destination ground terminal. In step 716, the satellite transmits the message to the ground terminal via the chosen spot beam (i.e. using RF or optical wireless signals).

In one embodiment, the in-space network has the ability to automatically discover that at least a portion of the wireless in-space network is not available and adjust the various data structures for determining how to route packets (see step 612 and step 708). In step 802, one of the nodes (e.g. one of the satellites) discovers that a link is not available (e.g. down or otherwise congested). For example, any one of the wireless links depicted in FIG. 4 could go down or be congested. In one example, the satellites are sending the control packets around the ring to verify that all the links are still running. These control packets are used to detect that a link is not available. In other embodiments, when transmitting messages on ringlets, an acknowledgment is set back to indicate that the link is up. If the acknowledgment of control packets are not received, the system can determine that a link is down or otherwise congested. Other means for detecting that links are unavailable are known in the art. In step 804 of FIG. 11, the node discovering that the link is not available will broadcast a control message to other nodes on the same ring indicating that the link is not available. In step 806, the node discovering that the link is not available broadcasts a control message regarding the link not being available to other nodes on a different ring. Other satellites receiving the control message will broadcast it on both of their rings too so that eventually the control message will be broadcast to the entire in-space network in step 808. When sending out the control message in steps 804-808, the message will be sent on both ringlets of any ring (as long as the ringlet is available). In step 810, the discovery node and other nodes receiving the broadcast will update their routing data structures to indicate updated paths to each of the nodes in the constellation. In step 812, the discovering node and the other nodes that receive the broadcast will communicate messages between satellites on the in-space network using the updated routing data structures.

The proposed technology provides a general increase in traffic capacity and enhanced link protection due to the orthogonally connected two RPRs. Additionally, there is an optimized path and awareness of node and link status.

For multicast service provisioning, from a source, the multicast frames, sent from a ground, are fed into one of the satellite-nodes and then travel in the in-space network in the four directions with copies forwarded and dropped to destined downlink nodes along with the optimized paths which formed VLANs. With the two-dimensional orthogonally connected RPRs, it is possible to optimize the VLANs in terms of topology and paths using MAC learning and VLAN tagging.

The present technology extends the fault-tolerance of link failure. A failed satellite can be bypassed using a topology update. In particular, all the frames in "transit" at the node can be forwarded in updated paths and the lost satellite node can be seen as a virtual node. With a change in the MAC address/port tables of its neighboring nodes. A change-back could be performed once the lost node is recovered and restored.

Other benefits of the proposed solution includes low cost, simple and easy-to-maintain network control; in particular, the nodes are of "plug-and-play" with fast recovery, as automatic topology discovery and advertisement of node capabilities allow systems to become operational without manual intervention.

One embodiment includes a satellite communication system, comprising a plurality of satellites. Each of the satellites is configured to wirelessly communicate with ground terminals. Each of the satellites is configured to wirelessly communicate with other satellites to form a wireless network comprising a first set of rings in a first orientation and a second set of rings in a second orientation. Each ring of the first set of rings and the second set of rings comprises two ringlets transmitting in opposite directions. Each satellite of the plurality of satellites is configured to communicate in a ring of the first set of rings and communicate in a ring of the second set of rings.

One embodiment includes a satellite communication system, comprising a spacecraft and a communications payload. The communications payload comprises a ground a communication interface configured to communicate with one or more ground terminals and an inter-satellite communication interface configured to communicate with other satellites via two network rings. Each network ring comprises two ringlets transmitting in opposite directions. The ground communication interface is connected to the inter-satellite communication interface.

One embodiment includes a method for operating a satellite communication system, comprising, accessing a message for communication to a destination via a constellation of satellites orbiting the Earth. Each of the satellites configured to wirelessly communicate with other satellites to form a wireless network comprising a first set of rings and a second set of rings such that each satellite of the constellation of satellites is configured to communicate in a ring of the first set of rings and communicate in a ring of the second set of rings. Each ring of the first set of rings and the second set of rings comprises two ringlets transmitting in opposite directions. The method further comprises identifying a target satellite of the constellation of satellites orbiting the Earth that will be in orbital position to service the destination at a future time of delivery of the message to the destination; operating a network switch on one or more satellites of the constellation of satellites orbiting the Earth to send the message toward the identified target satellite; and transmitting the message from the identified target satellite to the destination.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A satellite communication system, comprising:
   a plurality of satellites, each of the satellites is configured to wirelessly communicate with ground terminals, each of the satellites is configured to wirelessly communicate with other satellites to form a wireless network comprising a first set of rings in a first orientation and a second set of rings in a second orientation, each ring of the first set of rings and the second set of rings comprises two ringlets transmitting in opposite directions, each satellite of the plurality of satellites is configured to communicate in a ring of the first set of rings and communicate in a ring of the second set of rings, each of the satellites of the plurality are configured to automatically detect a portion of the wireless network being unavailable, and to alert other satellite that the portion of the wireless network being unavailable.

2. The satellite communication system of claim 1, wherein:
   the satellites are configured to travel in a set of planes;
   the first set of rings are intra-plane rings; and
   the second set of rings are inter-plane rings.

3. The satellite communication system of claim 1, wherein:
   the first set of rings are oriented South-North; and
   the second set of rings are oriented East-West.

4. The satellite communication system of claim 1, wherein:
   the first set of rings are orthogonal to the second set of rings.

5. The satellite communication system of claim 1, wherein:
   each satellite of the plurality of satellites is configured to communicate with four neighbors, with two of the neighbors being in a same plane and two of the neighbors being in neighboring planes.

6. The satellite communication system of claim 1, wherein:
   the plurality of satellites comprise a constellation of satellites orbiting the Earth;
   as each satellite of the constellation orbits the Earth, it is handed-off between ground terminals in different locations; and
   the plurality of satellites configured to determine a target satellite of the constellation of satellites orbiting the Earth that will be in orbital position to service a destination of a message at a future time of delivery of the message to the destination and transmit the message toward the identified target satellite.

7. The satellite communication system of claim 1, wherein:
   the plurality of satellites are Low Earth Orbit satellites or Medium Earth Orbit satellites.

8. The satellite communication system of claim 1, wherein:
   the satellites are configured to wirelessly communicate with other satellites via RF communication.

9. The satellite communication system of claim 1, wherein:
   the satellites are configured to wirelessly communicate with other satellites via optical communication.

10. The satellite communication system of claim 1, wherein:
   each of the satellites of the plurality include routing data structures that indicate an exit ringlet for sending messages to other satellite; and
   each of the satellites of the plurality are configured to update the routing data structures in response to the portion of the wireless network being unavailable.

11. A satellite communication system, comprising:
   a spacecraft; and
   a communications payload comprising a ground communication interface configured to communicate with one or more ground terminals and an inter-satellite communication interface configured to communicate with other satellites via two network rings, each network ring comprises two ringlets transmitting in opposite directions, the ground communication interface is connected to the inter-satellite communication interface, and the inter-satellite communication interface comprises:
a MAC client;
a first controller for the first ring in communication with the MAC client; and
a second controller for the second ring in communication with the MAC client.

12. The satellite communication system of claim 11, the inter-satellite communication interface comprises:
a first interface for an intra-plane ring in communication with the MAC client; and
a second interface for an inter-plane ring in communication with the MAC client.

13. The satellite communication system of claim 11, the inter-satellite communication interface comprises:
a first Ring Select for the first ring, the first Ring Select in communicating with the MAC client and the first controller;
a first Ringlet Data Path for a first ringlet of the first ring, the first Ringlet Data Path in communication with the first Ring Select and the MAC client;
a second Ringlet Data Path for a second ringlet of the first ring, the second Ringlet Data Path in communication with the first Ring Select and the MAC client;
a second Ring Select for the second ring, the second Ring Select in communicating with the MAC client and the second controller;
a third Ringlet Data Path for a first ringlet of the second ring, the third Ringlet Data Path in communication with the second Ring Select and the MAC client; and
a fourth Ringlet Data Path for a second ringlet of the second ring, the fourth Ringlet Data Path in communication with the second Ring Select and the MAC client.

14. The satellite communication system of claim 11, wherein:
the inter-satellite communication interface is configured to access a message for communication to a destination, identify a target spacecraft of a constellation of spacecraft orbiting the Earth that will be in orbital position to service the destination at a future time of delivery of the message to the destination, choose a ringlet to transmit the message based on the identified target spacecraft, and send the message toward the identified target satellite via the chosen ringlet.

15. The satellite communication system of claim 11, wherein:
the inter-satellite communication interface is configured to discover that at least a portion of a ringlet is not available, send out a control packet on one or both of the network rings identifying the portion of the ringlet that is not available and updating a routing data structure based on the portion of the ringlet is not available.

16. The satellite communication system of claim 11, wherein:
the ground communication interface is configured to receive a message from a ground terminal; and
the inter-satellite communication interface is configured to encapsulate the message into a layer two packet and transmit the layer two packet on one of the ringlets.

17. The satellite communication system of claim 11, wherein:
the inter-satellite communication interface is configured to operate as a layer two switch for communication with other satellites via two network rings.

18. The satellite communication system of claim 11, wherein:
the two network rings comprise an intra-plane ring and an inter-plane ring.

19. The satellite communication system of claim 11, wherein:
the two network rings comprise a first ring at a first orientation and a second ring at a second orientation.

20. The satellite communication system of claim 11, wherein:
the spacecraft is a bus of a satellite.

21. A method for operating a satellite communication system, comprising,
accessing a message for communication to a destination via a constellation of satellites orbiting the Earth, each of the satellites configured to wirelessly communicate with other satellites to form a wireless network comprising a first set of rings and a second set of rings such that each satellite of the constellation of satellites is configured to communicate in a ring of the first set of rings and communicate in a ring of the second set of rings, each ring of the first set of rings and the second set of rings comprises two ringlets transmitting in opposite directions;
identifying a target satellite of the constellation of satellites orbiting the Earth that will be in orbital position to service the destination at a future time of delivery of the message to the destination;
operating a network switch on one or more satellites of the constellation of satellites orbiting the Earth to send the message toward the identified target satellite;
transmitting the message from the identified target satellite to the destination;
automatically discovering that at least a portion of the wireless network is not available; and
sending out one or more control packets on the first set of rings and the second set of rings identifying the portion of the wireless network that is not available.

22. The method of claim 21, wherein:
the satellites are configured to travel in planes;
the first set of rings are inter-plane rings; and
the second set of rings are intra-plane rings.

23. The method of claim 21, further comprising:
updating routing data structures on the satellite based on the portion of the wireless network is not available; and
communicating between satellites using the updated routing data structures.

24. The method of claim 21, wherein the method further comprises:
encapsulating the message into a layer two packet, the network switch operates as a layer two switch that sends the message encapsulated in the layer two packet toward the identified target satellite via the first set of rings and the second set of rings.

25. The method of claim 21, wherein:
the operating the network switch on one or more satellites of the constellation of satellites orbiting the Earth to send the message toward the identified target satellite includes operating the first set of rings and the second set of rings as Resilient Packet Rings.

* * * * *